United States Patent [19]

Perregaux

[11] 4,415,236

[45] Nov. 15, 1983

[54] LIGHT DIFFUSING REFLECTOR FOR ELECTRO-OPTICAL DISPLAYS AND PROCESS FOR PRODUCING THEREOF

[75] Inventor: Alain Perregaux, Wettingen, Switzerland

[73] Assignee: BBC Brown, Boveri & Company, Limited, Baden, Switzerland

[21] Appl. No.: 175,698

[22] Filed: Aug. 6, 1980

Related U.S. Application Data

[63] Continuation of Ser. No. 925,762, Jul. 18, 1978, abandoned.

[30] Foreign Application Priority Data

Aug. 30, 1977 [CH] Switzerland ..................... 10539/77

[51] Int. Cl.³ .................................................. G02F 1/13
[52] U.S. Cl. .................................. 350/338; 350/339 D
[58] Field of Search ............... 350/288, 338, 345, 431, 350/339 D

[56] References Cited

U.S. PATENT DOCUMENTS

| | | | |
|---|---|---|---|
| 3,881,809 | 5/1975 | Fergason et al. | 350/338 |
| 4,042,294 | 8/1977 | Billings, Jr. et al. | 350/345 |
| 4,043,636 | 8/1977 | Eberhardt et al. | 350/345 |
| 4,106,859 | 8/1978 | Doriguzzi et al. | 350/338 |

FOREIGN PATENT DOCUMENTS 1434906  5/1976  United Kingdom ............... 350/338

OTHER PUBLICATIONS

Troupeau, "Improved Diurnal Reflector," published London, England, 1854.

*Primary Examiner*—John K. Corbin
*Assistant Examiner*—Richard F. Gallivan
*Attorney, Agent, or Firm*—Oblon, Fisher, Spivak, McClelland & Maier

[57] ABSTRACT

A light-diffusing reflector for electro-optical displays, especially displays which are based on the principle of a nematic liquid crystal rotating cell, wherein the reflector is formed of a metal foil with a reflecting surface having a first surface structure determined by furrow-shaped depressions, i.e. groover disposed in a preferential direction, and wherein a second groove structure formed as secondary groover in at least two different preferential directions which do not coincide with the preferential direction of the furrow-shaped groover of the first groove structure is embossed by pressing or rolling secondary groover into the metal foil such that the reflective surface is at least approximately optically isotropic.

4 Claims, 5 Drawing Figures

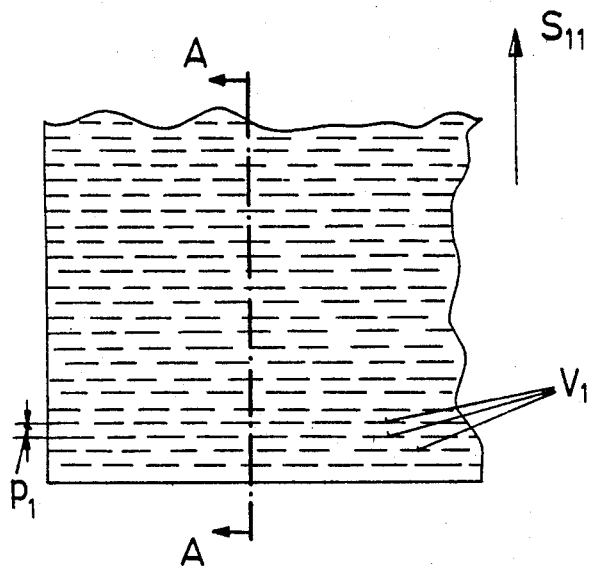
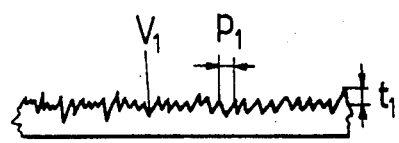
FIG. 1(a)   FIG. 1(b)
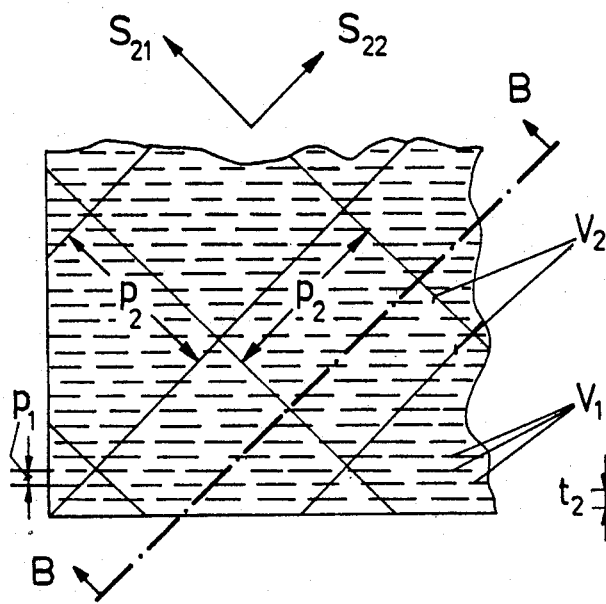
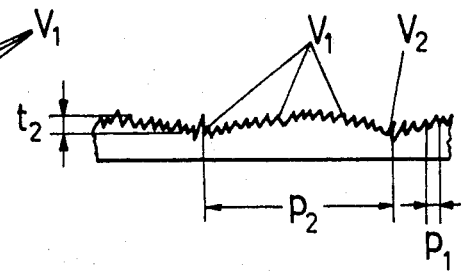
FIG. 2(a)   FIG. 2(b)

LIGHT DIFFUSING REFLECTOR FOR ELECTRO-OPTICAL DISPLAYS AND PROCESS FOR PRODUCING THEREOF

This is a continuation, of application Ser. No. 925,762, filed on July 18, 1978 now abandoned.

BACKGROUND OF THE INVENTION

1. Field of the Invention

The present invention relates to a light-diffusing reflector for electrooptical displays, especially for displays which are based on the principle of the nematic liquid crystal rotating cell, and in particular a reflector constructed of a foil, the reflecting surface of which has a first structure determined by furrow-shaped depressions arranged in a preferential direction.

2. Description of the Prior Art

Nematic liquid crystal rotating cells are understood to be mainly polarization modulators. Two polarizers in this case make the modulation of the surrounding light visible to the eye. In order to achieve a good contrast in a display based on the principle of the liquid crystal rotating cell and operated by reflection, it is necessary to provide behind the rotating cell provided with polarizers a reflector with a high reflective capacity and also with suitable diffuse scattering power.

Such reflectors consisting of two aluminum foils pressed against one another are used because of their low price and the reflective and scattering capacity which is sufficient for many applications, by many manufacturers in the production of displays which are based on the principle of the nematic liquid crystal rotary cell.

Since in the case of these reflectors the matted structure necessary for an adequate light diffusion is produced on the insides of two comparatively soft foils, for example aluminum foils with a thickness of 6 to 40 $\mu$m, which lie on top of one another and can be moved through the gap formed between two opposite rollers, this matted structure has furrow-shaped depressions approximately uniformly aligned in a preferential direction provided by the direction of movement of the rolled foils. This structure has the effect that the surface of the aluminum foil is optically anisotropic, and that the incident light is reflected at varying intensity depending upon the azimuth angle, as a result of the large proportion of regular reflection, so that when the display (and consequently the reflector) is turned round to azimuth, an observer will observe different brightnesses of the surface of the display. The term azimuth angle is to be understood here to mean the angle of the straight line formed by the intersection of the plane of incidence of the relevant beam of light with the reflected surface and the preferential direction of the structure of the surface. For some applications, for example in the case of clocks, it is desirable however that the surface of the display should retain its brightness even in the case of azimuth rotation, because in this way neither the aesthetic sense of the observer is upset nor is the readability adversely affected.

From DT-OS No. 2 531 372 is known a reflector for liquid crystal displays which employs a bubble-shaped structure for the reflector surface and which achieves a practically ideal brightness of the display surface practically independently of the azimuth angle. In the production of such a reflector, however, several process stages are necessary which bring about a considerable increase in the production costs of the reflector and make its use more difficult in the case of mass-produced products.

SUMMARY OF THE INVENTION

Accordingly, it is an object of this invention to provide a novel reflector of the type mentioned above, whose reflected intensity is for the most part independent of the azimuth angle and which furthermore can be produced in a very economical manner in a simple process which is suitable for mass production.

This and other objects are achieved according to the invention by fabricating a foil reflector having the above-described matted structure with a reflective surface characterized by furrow-shaped depressions, i.e. grooves, approximately uniformly aligned in a preferential direction, and then providing the reflective surface with a second structure wherein the matted depressions, i.e. grooves are then arranged in such a way that the surface is at least approximately optically isotropic.

The process according to the invention is characterized by the fact that the second groove structure is embossed by rolling or pressing into the reflecting surface provided with the first structure.

The reflector according to the invention is characterized by a high reflection coefficient, the dependence of which upon the azimuth angle is very much less than in the case of the aluminum foil reflector mentioned above. In addition, the reflector of the invention is simple and cheap to manufacture and provides a high degree of brightness and strength of contrast of the information represented on the display surface of electro-optical displays.

Particularly advantageous properties are imparted to the reflector if the grooves of the second structure are arranged in at least two different preferential directions which do not coincide with the position of the preferential direction of the first structure, and if the second groove structure is periodic in at least one preferential direction. If, for example, the second groove structure consists of periodically arranged squares or regular hexagons, the dependence upon the azimuth of the reflected intensity of the incident beam of light is for the most part destroyed.

In this case, it is advantageous to choose the distance between adjacent depressions of common secondary grooves along a preferential direction in such a way that this distance is a multiple of the distance between adjacent grooves along the preferential direction of the first structure, because such a reflector, despite the coarser screen of the second groove structure, is particularly simple and consequently economical to produce.

If, in addition to this, one chooses as the period of the second groove structure at most a few hundred um, while concurrently establishing a groove depth of up to 10 $\mu$m, one obtains when using a metal foil which has been produced by rolling two aluminum foils pressed on their rough side in which out of the remaining two surfaces at least one has an approximately periodical structure with a period which is approximately between 2 and 20 $\mu$m and has a depth of the furrow-shaped groove of up to 5 $\mu$m, a display surface which still appears grid-free to the observer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1(a) is a plan view of a section of the surface of an enlarged and greatly simplified metal foil used as a reflector by various manufacturers;

FIG. 1(b) is a cross-sectional view through this foil along the line A—A of FIG. 1a;

FIG. 2(a) is a plan view of a section of the surface of an enlarged and greatly simplified reflector according to the invention, with a square second structure;

FIG. 2(b) is a cross-sectional view through this reflector along the line B—B of FIG. 2a.

DETAILED DESCRIPTION OF THE PREFERRED EMBODIMENTS

Figure 2C:
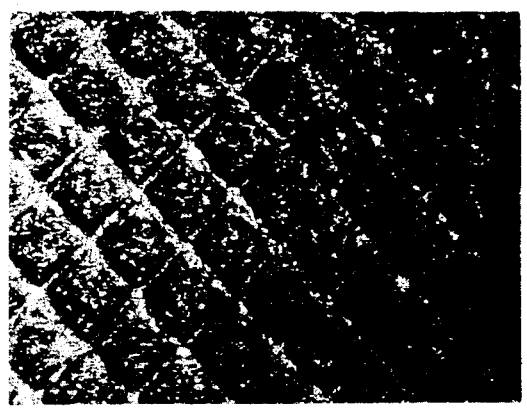
FIG. 2(c) shows an 80-fold photographic enlargement of a section of the surface of a reflector according to the invention with a square second structure of a period of 150 $\mu$m.

Referring now to the drawings, wherein like reference numerals designate identical or corresponding parts throughout the several views, and more particularly to FIG. 1a thereof, there is seen in a highly idealized form an aluminum foil used by various manufacturers as the reflector in liquid crystal displays. On the reflecting surface of this foil there are grooves $V_1$ arranged along a preferential direction $S_{11}$, which during the production of the foil are formed by pressing by means of rollers two aluminum foils placed opposite one another with their rough sides. According to the manufacturing process and the initial material this reflecting foil is between about 8 and 40 $\mu$m thick. The grooves can have a depth $t_1$ of up to 5 $\mu$m. In the preferential direction $S_{11}$ determined by the movement of the foil during manufacture, the adjacent grooves usually have a distance of 2 to 20 $\mu$m, so that on the surface of such a foil a structure occurs with a period $P_1$ which is between 2 and 20 $\mu$m.

FIG. 1b shows a section through this foil along the line A—A of FIG. 1a.

On the basis of the grooves arranged in one preferential direction, the surface of the reflecting foil is optically anisotropic so that the reflection coefficient of the surface is dependent upon the azimuth angle, that is to say on the angle between the preferential direction and the intersecting straight line of the plane of incidence of the incident beam of light and the reflector surface. If such a reflector is located behind a nematic liquid crystal rotary cell arranged between two polarizers, an observer perceives a varying brightness of the surface of the display when the display device is rotated in an azimuth direction.

In FIG. 2a the same foil is represented but this time provided with a second groove structure. This second groove structure consists of adjacent squares which are repeated both in the preferential direction $S_{21}$ and also $S_{22}$ with the period $P_2$. This second structure is determined by grooves $V_2$ which occur both in the direction $S_{21}$ and also $S_{22}$, in each case at a distance corresponding to the period $P_2$. These grooves $V_2$ have depths $t_2$ of up to 10 $\mu$m and preferably have a distance which is several times greater than that of the grooves of the first structure. If the period $P_2$ of the second groove structure is at most a few hundred $\mu$m, the display surface appears grid-free on account of the low resolution of the eye. In the case of larger periods, for example $p_2 \sim 0.5$ mm, the screen can be seen on the surface of the display. This may be advantageous in special applications, such as for example if no uniform background is desired but rather a patterned one.

In FIG. 2b a section is shown through the reflector according to the invention along the line B—B.

By the application of grooves of the second structure the optical anisotropy of the surface of the original foil is reduced.

FIG. 2c shows an 80-fold photographic enlargement of a section of the surface of a reflector according to the invention. This reflector consists of an aluminum foil approximately 20 $\mu$m thick with grooves $V_1$ of the period $p_1 \sim 5$ $\mu$m and a depth of $t_1 \sim 1$ $\mu$m and a second lattice groove structure embossed by rollers, the meshes of the lattice being squares, and the distance between the meshes formed by the grooves is about 150 $\mu$m and the grooves are embossed by about 10 $\mu$m into the foil. With such a reflector the dependence upon the azimuth of the reflection coefficient is considerably reduced so that the azimuth brightness fluctuations of the display surface of an electro-optical display device equipped with this is many times smaller than in the case of a display device provided only with a reflector according to FIG. 1.

Instead of squares it is possible for the second groove structure advantageously also to consist of other elements, such as regular rectangles.

In order to obtain a colored display it is possible to use colored reflectors.

The reflector according to the invention is suitable for all electro-optical displays, that is to say not only for nematic liquid crystal rotary cells, but also for liquid crystal displays which are based on the principle of the guest/host effect, or electrochromatic displays.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reflector for liquid crystal displays formed of a foil with a diffuse reflecting surface, comprising:
    first parallel furrow-shaped grooves aligned in a first detection, said first parallel grooves having a spacing between 2 and 20 $\mu$m and a maximal depth of 5 $\mu$m; and
    at least second and third parallel furrow-shaped grooves aligned in a second and in a third direction, said at least second and third parallel grooves crossing said first parallel grooves and also each other, said second and third parallel grooves having a spacing between 150 and 500 $\mu$m and a maximum depth of 10 $\mu$m.

2. A reflector according to claim 1, wherein said foil consists of aluminum and said at least second and third grooves forming a lattice of squares or hexagons.

3. A process for producing a reflector for liquid crystal displays formed of a foil with a diffuse reflecting surface, comprising:
    producing a first regular surface structure of first parallel furrow-shaped grooves on said foil by placing two foils each having a rough surface opposite one another with their rough surfaces facing each other, and then rolling said foils in a first direction, such that the so-formed first grooves have a spacing between 2 and 20 $\mu$m and a maximal depth of 5 $\mu$m, and superimposing a second regular surface structure of at least second and third furrow-shaped grooves, which cross each other, on the foil with said first regular surface structure, by embossing said second structure by means of rolls, such that said second and third grooves cross said first grooves and have a spacing between 150 and 500 μm and a maximal depth of 10 μm.

4. A process according to claim 3, wherein said foil is an aluminum foil.

* * * * *